United States Patent
Koo et al.

(10) Patent No.: US 6,368,507 B1
(45) Date of Patent: *Apr. 9, 2002

(54) COMPOSITE POLYAMIDE REVERSE OSMOSIS MEMBRANE AND METHOD OF PRODUCING THE SAME

(75) Inventors: Ja-Young Koo, Acton, MA (US); Young Seo Yoon, Seoul (KR); Nowon Kim, Pusan (KR); Jong-Eun Kim, Jeju-si (KR)

(73) Assignee: Saekan Industries Incorporation (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/172,594

(22) Filed: Oct. 14, 1998

(51) Int. Cl.$^7$ ................................................ B01D 39/00
(52) U.S. Cl. ............. 210/500.38; 210/490; 210/500.27; 210/500.42
(58) Field of Search .................. 210/500.38, 490, 210/500.27, 500.37, 500.42; 264/41; 427/244, 245

(56) References Cited

U.S. PATENT DOCUMENTS

| | | | |
|---|---|---|---|
| 3,817,386 A | | 6/1974 | Frost et al. |
| 3,904,519 A | | 9/1975 | McKinney, Jr. et al. |
| 4,277,344 A | | 7/1981 | Cadotte |
| 4,340,480 A | | 7/1982 | Pall et al. |
| 4,761,234 A | * | 8/1988 | Uemura et al. ........ 210/500.38 |
| 4,769,148 A | * | 9/1988 | Fibiger et al. ......... 210/500.38 |
| 4,830,885 A | | 5/1989 | Tran et al. |
| 4,859,384 A | * | 8/1989 | Fibiger et al. ............. 264/45.1 |
| 4,872,984 A | | 10/1989 | Tomaschke |
| 4,950,404 A | * | 8/1990 | Chau ...................... 210/500.38 |
| 4,980,067 A | | 12/1990 | Hou et al. |
| 4,983,291 A | | 1/1991 | Chau et al. |
| 5,254,261 A | * | 10/1993 | Tomaschke et al. |
| 5,576,057 A | | 11/1996 | Hirose et al. |
| 5,614,099 A | | 3/1997 | Hirose et al. |
| 5,746,917 A | | 5/1998 | Altmeier |
| 5,843,351 A | | 12/1998 | Hirose et al. |
| 5,922,203 A | * | 7/1999 | Tomaschke ............ 210/500.37 |
| 6,015,495 A | * | 1/2000 | Koo et al. |

* cited by examiner

*Primary Examiner*—Ana Fortuna
(74) *Attorney, Agent, or Firm*—Kriegsman & Kriegsman

(57) ABSTRACT

A composite polyamide reverse osmosis membrane and method of producing same. In one embodiment, the membrane is made by coating a porous polysulfone support for about 40 seconds with an aqueous solution containing (i) a polyfunctional amine in the form of 2 wt % of meta-phenylenediamine (MPD), (ii) a polar solvent in the form of 0.3 wt % 2-ethyl-1,3-hexanediol (EHD), and (iii) an amine salt-forming combination of 2.3 wt % camphorsulfonic acid (CSA) and 1.1 wt % triethylamine (TEA). Next, the excess aqueous solution is removed, and the coated support is dipped for about 1 minute in a 0.1 wt % organic solvent solution of trimesoyl chloride (TMC) in a mixture of alkanes having from 8 to 12 carbon atoms. After draining the organic solvent solution off, the resulting composite membrane is heated at 90° C. for about 3.5 minutes and then rinsed in a 0.2% $Na_2CO_3$ aqueous solution at room temperature. The resultant membrane exhibits a flux of 47.9 gfd and a salt rejection of 97.6% when used at 225 psi for an aqueous solution containing 2000 ppm of NaCl. In another embodiment, the aqueous solution contains (i) a polyfunctional amine in the form of 2 wt % of MPD, (ii) a combination of polar solvents in the form of 0.3 wt % of EHD and 2 wt % of dimethyl sulfoxide, and (iii) an amine salt-forming combination of 1 wt % of 1,1,3,3-tetramethylguanidine and 1.6 wt % toluene sulfonic acid. The resultant membrane exhibits a flux of 63.7 gfd and a salt rejection of 90.8% when used at 225 psi for an aqueous solution containing 2000 ppm of NaCl.

52 Claims, No Drawings

COMPOSITE POLYAMIDE REVERSE OSMOSIS MEMBRANE AND METHOD OF PRODUCING THE SAME

BACKGROUND OF THE INVENTION

The present invention relates generally to reverse osmosis membranes and more particularly to a novel composite polyamide reverse osmosis membrane and to a method of producing the same.

It is known that dissolved substances can be separated from their solvents by the use of various types of selective membranes, examples of such membranes including microfiltration membranes, ultrafiltration membranes and reverse osmosis membranes. One use to which reverse osmosis membranes have previously been put is in the desalination of brackish water or seawater to provide large volumes of relatively non-salty water suitable for industrial, agricultural or home use. What is involved in the desalination of brackish water or seawater using reverse osmosis membranes is literally a filtering out of salts and other dissolved ions or molecules from the salty water by forcing the salty water through a reverse osmosis membrane whereby purified water passes through the membrane while salts and other dissolved ions and molecules do not pass through the membrane. Osmotic pressure works against the reverse osmosis process, and the more concentrated the feed water, the greater the osmotic pressure which must be overcome.

A reverse osmosis membrane, in order to be commercially useful in desalinating brackish water or seawater on a large scale, must possess certain properties. One such property is that the membrane have a high salt rejection coefficient. In fact, for the desalinated water to be suitable for many commercial applications, the reverse osmosis membrane should have a salt rejection capability of at least about 97%. Another important property of a reverse osmosis membrane is that the membrane possess a high flux characteristic, i.e., the ability to pass a relatively large amount of water through the membrane at relatively low pressures. Typically, the flux for the membrane should be greater than 10 gallons/ft$^2$-day (gfd) at a pressure of 800 psi for seawater and should be greater than 15 gfd at a pressure of 220 psi for brackish water. More preferably, the flux for the membrane is at least about 22 gfd at brackish water conditions. For certain applications, a rejection rate that is less than would otherwise be desirable may be acceptable in exchange for higher flux and vice versa.

One common type of reverse osmosis membrane is a composite membrane comprising a porous support and a thin polyamide film formed on the porous support. Typically, the polyamide film is formed by an interfacial polymerization of a polyfunctional amine and a polyfunctional acyl halide.

An example of the aforementioned composite reverse osmosis membrane is disclosed in U.S. Pat. No. 4,277,344, inventor Cadotte, which issued Jul. 7, 1981, and which is incorporated herein by reference. The aforementioned patent describes an aromatic polyamide film which is the interfacial reaction product of an aromatic polyamine having at least two primary amines substituents with an aromatic acyl halide having at least three acyl halide substituents. In the preferred embodiment, a porous polysulfone support is coated with m-phenylenediamine in water. After removal of excess m-phenylenediamine solution from the coated support, the coated support is covered with a solution of trimesoyl chloride dissolved in "FREON" TF solvent (trichlorotrifluoroethane). The contact time for the interfacial reaction is 10 seconds, and the reaction is substantially complete in 1 second. The resulting polysulfone/polyamide composite is then air-dried.

Although the Cadotte membrane described above exhibits good flux and good salt rejection, various approaches have been taken to further improve the flux and salt rejection of composite polyamide reverse osmosis membranes. In addition, other approaches have been taken to improve the resistance of said membranes to chemical degradation and the like. Many of these approaches have involved the use of various types of additives to the solutions used in the interfacial polycondensation reaction.

For example, in U.S. Pat. No. 4,872,984, inventor Tomaschke, which issued Oct. 10, 1989, and which is incorporated herein by reference, there is disclosed an aromatic polyamide membrane formed by (a) coating a microporous support with an aqueous solution comprising (i) an essentially monomeric, aromatic, polyamine reactant having at least two amine functional groups and (ii) an amine salt to form a liquid layer on the microporous support, (b) contacting the liquid layer with an organic solvent solution of an essentially monomeric, aromatic, amine-reactive reactant comprising a polyfunctional acyl halide or mixture thereof, wherein the amine-reactive reactant has, on the average, at least about 2.2 acyl halide groups per reactant molecule, and (c) drying the product of step (b) so as to form a water permeable membrane.

The amine salt of Tomaschke is a monofunctional, monomeric (i.e., polymerizable) amine. Preferably, said amine salt is a water soluble salt of a strong acid and a tertiary amine selected from the group consisting of a trialkylamine, such as trimethylamine, triethylamine, tripropylamine; an N-alkylcycloaliphatic amine, such as 1-methylpiperidine; an N,N-dialkylamine, such as N,N-dimethylethylamine and N,N-diethylmethylamine; an N,N-dialkyl ethanolamine, such as N,N-dimethylethanolamine; a bicyclic tertiary amine, such as 3-quinuclidinol; and mixtures thereof, or is a quaternary amine selected from at least one member of the group consisting of a tetraalkylammonium hydroxide, such as tetramethylammonium hydroxide, tetraethylammonium hydroxide and tetrapropylammonium hydroxide; a benzyltrialkylammonium hydroxide, such as benzyltrimethylammonium hydroxide, benzyltriethylammonium hydroxide and benzyltripropylammonium hydroxide; and mixtures thereof.

In U.S. Pat. No. 4,983,291, inventors Chau et al., which issued Jan. 8, 1991, and which is incorporated herein by reference, there is disclosed a membrane which comprises a polymerized reaction product within and/or on a porous support backing material. According to the Chau et al. patent, said membrane may be prepared by contacting a porous support with an aqueous solution of a polyamine which may, if so desired, contain a polar aprotic solvent not reactive with the amines, a polyhydric compound and an acid acceptor. The polyhydric compound, which may include ethylene glycol, propylene glycol, glycerin and other longer carbon atom backbone glycols, may be present in the aqueous solution in an amount ranging from about 0.1 to about 50%. The surface of the coated support is freed of excess solution and thereafter contacted with an organic solution of a polyacyl halide for a period of time sufficient to form a polymerized reaction product within and/or on the support material. The resulting composite is then treated with a hydroxypolycarboxylic acid, polyaminoalkylene polycarboxylic acid, sulfonic acid, amine salts of acids, amino acid, amino acid salt, polymeric acid and inorganic acid, before drying of the membrane.

In U.S. Pat. No. 5,576,057, inventors Hirose et al., which issued Nov. 19, 1996, and which is incorporated herein by reference, there is disclosed a composite reverse osmosis membrane comprising a polyamide type skin layer on a porous support, said membrane being formed by coating a solution A containing a compound having at least two reactive amino groups on the porous support and, thereafter, contacting a solution B containing a polyfunctional acid halide with the coated layer of solution A, wherein the difference between a solubility parameter of solution A and a solubility parameter of solution B is from 7 to 15 $(cal/cm^3)^{1/2}$.

Examples of the solvent for solution A set forth in Hirose et al. ('057) are a mixed solvent of water and an alcohol such as ethanol, propanol, butanol, butyl alcohol, 1-pentanol, 2-pentanol, t-amyl alcohol, isoamyl alcohol, isobutyl alcohol, isopropyl alcohol, undecanol, 2-ethylbutanol, 2-ethylhexanol, octanol, cyclohexanol, tetrahydrofurfuryl alcohol, neopentyl glycol, t-butanol, benzyl alcohol, 4-methyl-2-pentanol, 3-methyl-2-butanol, pentyl alcohol, allyl alcohol, ethylene glycol, diethylene glycol, triethylene glycol, tetraethylene glycol, propanediol, butanediol, pentanediol, hexanediol, glycerol, etc.; and a mixed solvent of water and a nitrogen compound such as nitromethane, formamide, methylformamide, acetonitrile, dimethylformamide, ethylformamide, etc. As an example of the mixing ratio of water and the other solvent of solution A, Hirose et al. ('057) states that the mixing ratio of water/ethanol can be selected in the range of (50 to 90)/(50 to 10), and preferably (60 to 90)/(40 to 10). Hirose et al. ('057) elsewhere states that the amine salts described in JP-A-2-187135 (corresponding to U.S. Pat. No. 4,872,984), such as a salt of a tetraalkylammonium halide or a trialkylamine and an organic acid can also be suitably used for the solution A to facilitate the film formation, improve the absorption of the amine solution in the support, and accelerate the condensation reaction.

In U.S. Pat. No. 5,614,099, inventors Hirose et al., which issued Mar.25, 1997, and which is incorporated herein by reference, there is disclosed a composite reverse osmosis membrane having a polyamide type skin layer whose average surface roughness is at least 55 nm. The polyamide type skin layer comprises the reaction product of a compound having amino groups and a polyfunctional acid halide compound having acid halide groups. A polymer film may be formed by contacting a solution containing, for example, m-phenylenediamine with a porous polysulfone supporting film so as to form a layer of the solution on the supporting film, then contacting the film with a solution of trimesic acid chloride and holding the film in a hot air dryer so that a polymer film is formed on the supporting film. The surface of the polyamide type skin layer can also be treated with quaternary ammonium salt and coated with a cross-linked layer of an organic polymer having positively-charged groups.

According to Hirose et al. ('099), the compound having multiple amino groups is preferably present in a solution A, said solution A comprising a compound having a solubility parameter of 8–14 $(cal/cm^3)^{1/2}$, said compound being selected from the group consisting of certain alcohols, ethers, ketones, esters, halogenated hydrocarbons and sulfur-containing compounds. Specific examples of said compound are disclosed in the Hirose et al. ('099) patent. Elsewhere, Hirose et al. ('099) states that the amine salts described in JP-A-2-187135, such as a salt of a tetraalkylammonium halide or a trialkylamine and an organic acid can also be suitably used for the solution to facilitate the film formation, improve the absorption of the amine solution in the support, and accelerate the condensation reaction.

Although the membranes described above possess a relatively high degree of water permeability, it is nonetheless still desirable to further improve the flux of these types of membranes so that they can be operated at lower pressures, such as at 120 psi, in order to conserve energy while still maintaining a high degree of salt rejection.

Other patents of interest include U.S. Pat. No. 4,950,404, inventor Chau, issued Aug. 21, 1990; U.S. Pat. No. 4,761,234, inventors Uemura et al., which issued Aug. 2, 1988, and U.S. Pat. No. 4,769,148, inventors Fibiger et al., which issued Sep. 6, 1988, all of which are incorporated herein by reference.

SUMMARY OF THE INVENTION

It is an object of the present invention to provide a novel polyamide membrane.

According to one aspect of the invention, there is provided a polyamide membrane comprising a reaction product of (i) an aqueous solution comprising a polyfunctional amine, a salt-containing compound and one or more polar solvents, said salt-containing compound comprising at least one amine salt functional group and at least one amine functional group, and (ii) an organic solvent solution comprising an amine-reactive reactant selected from the group consisting of a polyfunctional acyl halide, a polyfunctional sulfonyl halide and a polyfunctional isocyanate.

Preferably, said amine salt functional group is a tertiary amine salt functional group, and said amine functional group is a tertiary amine functional group. Moreover, said salt-containing compound is preferably the reaction product of a strong acid and a polyfunctional tertiary amine. Preferred examples of said strong acid include methanesulfonic acid, toluenesulfonic acid, camphorsulfonic acid, ethanesulfonic acid and benzenesulfonic acid. Preferred examples of said polyfunctional tertiary amine include 1,4-diazabicyclo[2,2,2]octane, 1,8-diazabicyclo[5,4,0]undec-7-ene, N,N,N',N'-tetramethyl-1,3-butanediamine, N,N,N',N'-tetramethyl-1,6-hexanediamine, N,N,N',N'',N''-pentamethyldiethylenetriamine, 1,1,3,3-tetramethylguanidine, N,N,N',N'-tetramethylethylenediamine, substituted imidazoles including 1,2-dimethylimidazole and 1-alkyl-substituted imidazoles, and mixtures thereof.

Said one or more polar solvents are preferably selected from the group consisting of ethylene glycol derivatives, propylene glycol derivatives, 1,3-propanediol derivatives, sulfoxide derivatives, sulfone derivatives, nitrile derivatives and urea derivatives. Preferred examples of said polar solvents include alkoxyethanols, such as 2-methoxyethanol, 2-ethoxyethanol, 2-propoxyethanol, and 2-butoxyethanol, 1-pentanol, 1-butanol, di(ethylene glycol) t-butylmethyl ether, di(ethylene glycol)hexyl ether, propylene glycol butyl ether, propylene glycol propyl ether, 1,3-heptanediol, 2-ethyl-1,3-hexanediol, 1,3-hexanediol, 1,3-pentanediol, dimethyl sulfoxide, tetramethylene sulfoxide, butyl sulfoxide, methylphenyl sulfoxide, tetramethylene sulfone, butyl sulfone, acetonitrile, propionitrile and 1,3-dimethyl-2-imidazolidinone.

Said one or more polar solvents are also preferably present in said aqueous solution in a total amount constituting about 0.01 to 8%, by weight, of said aqueous solution.

According to another aspect of the invention, there is provided a polyamide membrane comprising a reaction product of (i) an aqueous solution comprising a polyfunctional amine, a salt-containing compound and one or more polar solvents, said salt-containing compound being a reaction product of a strong acid and a polyfunctional tertiary amine and (ii) an organic solvent solution comprising an amine-reactive reactant selected from the group consisting of a polyfunctional acyl halide, a polyfunctional sulfonyl halide and a polyfunctional isocyanate.

The aforementioned polyfunctional tertiary amine has n tertiary amine functional groups, n being greater than or equal to 2, and said polyfunctional tertiary amine and said strong acid are preferably reacted together in a molar ratio that is greater than or equal to 1:1, respectively, and is less than 1:n, respectively. More preferably, said polyfunctional tertiary amine and said strong acid are reacted together in a molar ratio that is less than 1:(0.95)n, respectively. Even more preferably, said polyfunctional tertiary amine and said strong acid are reacted together in a molar ratio that is less than 1:(0.9)n, respectively.

According to yet another aspect of the invention, there is provided a polyamide membrane comprising a reaction product of (i) an aqueous solution comprising a polyfunctional amine, an amine salt and one or more polar solvents, wherein said one or more polar solvents are selected from the group consisting of 2-ethyl-1,3-hexanediol; a combination of 2-ethyl-1,3-hexanediol and dimethyl sulfoxide; di(ethylene glycol) hexyl ether; a combination of di(ethylene glycol) hexyl ether and dimethyl sulfoxide; di(ethylene glycol) t-butylmethyl ether; a combination of an alkoxyethanol and dimethyl sulfoxide; propylene glycol butyl ether; propylene glycol propyl ether; triethylene glycol dimethyl ether; 1,3-dimethyl-2-imidazolidinone; a combination of 2-ethyl-1,3-hexanediol and acetonitrile; tetramethylene sulfoxide; butyl sulfoxide; methylphenyl sulfoxide; butyl sulfone; and mixtures thereof, and (ii) an organic solvent solution comprising an amine-reactive reactant selected from the group consisting of a polyfunctional acyl halide, a polyfunctional sulfonyl halide and a polyfunctional isocyanate.

Preferably, said amine salt is selected from the group consisting of a quaternary ammonium salt and a reaction product of a strong acid and a tertiary amine. The tertiary amine may be a monofunctional tertiary amine or a polyfunctional tertiary amine.

According to still yet another aspect of the invention, there is provided a polyamide membrane comprising a reaction product of (i) an aqueous solution comprising a polyfunctional amine, an amine salt and one or more polar solvents, wherein said one or more polar solvents are selected from the group consisting of an alkoxyethanol in an amount constituting about 0.05% to about 4%, by weight, of said aqueous solution; dimethyl sulfoxide in an amount constituting about 0.01% to about 8%, by weight, of said aqueous solution; a combination of an alkoxyethanol in an amount constituting about 0.05% to about 4%, by weight, of said aqueous solution and dimethyl sulfoxide in an amount constituting about 0.01% to about 8%, by weight, of said aqueous solution; 1-pentanol in an amount constituting about 0.01% to about 2%, by weight, of said aqueous solution; 1-butanol in an amount constituting about 0.01% to about 3%, by weight, of said aqueous solution; and tetramethylene sulfone in an amount constituting about 0.01% to about 4%, by weight, of said aqueous solution, and (ii) an organic solvent solution comprising an amine-reactive reactant selected from the group consisting of a polyfunctional acyl halide, a polyfunctional sulfonyl halide and a polyfunctional isocyanate.

Preferably, said amine salt is selected from the group consisting of a quaternary ammonium salt and a reaction product of a strong acid and a tertiary amine. The tertiary amine may be a monofunctional tertiary amine or a polyfunctional tertiary amine.

The present invention is also directed to a composite reverse osmosis membrane comprising a porous support and a polyamide membrane of the type broadly described above.

It is another object of the present invention to provide a method of producing a composite reverse osmosis membrane.

Consequently, according to a further aspect of the invention, there is provided a method of making a composite reverse osmosis membrane, said method comprising the steps of:

(a) coating a porous support with an aqueous solution comprising a polyfunctional amine, one or more polar solvents and a salt-containing compound, said salt-containing compound being a reaction product of a strong acid and a polyfunctional tertiary amine, so as to form a liquid layer on said porous support;

(b) contacting said liquid layer with an organic solvent solution comprising an amine-reactive reactant selected from the group consisting of a polyfunctional acyl halide, a polyfunctional sulfonyl halide and a polyfunctional isocyanate so as to interfacially condense said amine-reactive reactant with said polyfunctional amine, thereby forming a cross-linked, interfacial polyamide layer on said porous support; and (c) drying the product of step (b) to form a composite reverse osmosis membrane.

According to yet a further aspect of the invention, there is provided a method of making a composite reverse osmosis membrane, said method comprising the steps of:

(a) coating a porous support with a first aqueous solution, said first aqueous solution comprising one or more polar solvents and an amine salt, so as to form a first liquid layer on said porous support;

(b) coating the first liquid layer with a second aqueous solution, said second aqueous solution comprising a polyfunctional amine, so as to form a second liquid layer over said first liquid layer;

(c) contacting the twice-coated porous support with an organic solvent solution comprising an amine-reactive reactant selected from the group consisting of a polyfunctional acyl halide, a polyfunctional sulfonyl halide and a polyfunctional isocyanate so as to interfacially condense said amine-reactive reactant with said polyfunctional amine, thereby forming a cross-linked, interfacial polyamide layer on said porous support; and (d) drying the product of step (c) to form a composite reverse osmosis membrane.

According to still yet another aspect of the invention, there is provided a method of making a composite reverse osmosis membrane, said method comprising the steps of:

(a) coating a porous support with a first aqueous solution, said first aqueous solution comprising one or more polar solvents, so as to form a first liquid layer on said porous support;

(b) coating the first liquid layer with a second aqueous solution, said second aqueous solution comprising a polyfunctional amine and an amine salt, so as to form a second liquid layer over said first liquid layer;

(c) contacting the twice-coated porous support with an organic solvent solution comprising an amine-reactive reactant selected from the group consisting of a polyfunctional acyl halide, a polyfunctional sulfonyl halide and a polyfunctional isocyanate so as to interfacially condense said amine-reactive reactant with said polyfunctional amine, thereby forming a cross-linked, interfacial polyamide layer on said porous support; and (d) drying the product of step (c) to form a composite reverse osmosis membrane.

Additional objects, features, aspects and advantages of the present invention will be set forth, in part, in the description which follows and, in part, will be obvious from the description or may be learned by practice of the invention. Certain embodiments of the invention will be described hereafter in sufficient detail to enable those skilled in the art to practice the invention, and it is to be understood that other embodiments may be utilized and that structural or other changes may be made without departing from the scope of the invention. The following detailed description is, therefore, not to be taken in a limiting sense, and the scope of the present invention is best defined by the appended claims.

DETAILED DESCRIPTION OF PREFERRED EMBODIMENTS

As set forth above, the present invention is directed to a novel composite reverse osmosis membrane. The composite reverse osmosis membrane of the present invention comprises (a) a porous support and (b) a polyamide membrane disposed on said porous support, said polyamide membrane being a reaction product of (i) an aqueous solution comprising a polyfunctional amine, an amine salt and one or more polar solvents, the specific amine salt and/or one or more polar solvents used in accordance with the present invention being discussed below and (ii) an organic solvent solution comprising an amine-reactive reactant selected from the group consisting of a polyfunctional acyl halide, a polyfunctional sulfonyl halide and a polyfunctional isocyanate.

The porous support of the present invention is typically a microporous support. The particular microporous support employed in the present invention is not critical thereto but is generally a polymeric material containing pore sizes which are of sufficient size to permit the passage of permeate therethrough but not large enough so as to interfere with the bridging over of the ultrathin membrane formed thereon. The pore size of the support will generally range from 1 to 500 nanometers inasmuch as pores which are larger in diameter than 500 nanometers will permit the ultrathin film to sag into the pores, thus disrupting the flat sheet configuration desired. Examples of microporous supports useful in the present invention include those made of a polysulfone, a polyether sulfone, a polyimide, a polyamide, polypropylene and various halogenated polymers, such as polyvinylidene fluoride. Additional microporous support materials may be found in the patents incorporated herein by reference.

The thickness of the microporous support is not critical to the present invention. Generally, the thickness of the microporous support is about 25 to 125 µm, preferably about 40 to 75 µm.

The polyfunctional amine reactant employed in the present invention is preferably an essentially monomeric amine having at least two amine functional groups, more preferably 2 to 3 amine functional groups. The amine functional group is typically a primary or secondary amine functional group, preferably a primary amine functional group. The particular polyamine employed in the present invention is not critical thereto and may be a single polyamine or a combination thereof. Examples of suitable polyamines include aromatic primary diamines, such as meta-phenylenediamine and para-phenylenediamine and substituted derivatives thereof, wherein the substituent includes, e.g., an alkyl group, such as a methyl group or an ethyl group, an alkoxy group, such as a methoxy group or an ethoxy group, a hydroxy alkyl group, a hydroxy group or a halogen atom. Additional examples of suitable polyamines include alkanediamines, such as 1,3-propanediamine and its homologs with or without N-alkyl or aryl substituents, cycloaliphatic primary diamines, such as cyclohexane diamine, cycloaliphatic secondary diamines, such as piperizine and its alkyl derivatives, aromatic secondary amines, such as N,N'-dimethyl-1,3-phenylenediamine, N,N'-diphenylethylene diamine, benzidine, xylylene diamine and derivatives thereof. Other suitable polyamines may be found in the patents incorporated herein by reference. The preferred polyamines of the present invention are aromatic primary diamines, more preferably m-phenylenediamine.

The polyamine is present in an aqueous solution in an amount in the range of from about 0.1 to 20%, preferably 0.5 to 8%, by weight, of the aqueous solution. The pH of the aqueous solution is in the range of from about 7 to 13. The pH can be adjusted by the addition of a basic acid acceptor in an amount ranging from about 0.001% to about 5%, by weight, of the solution. Examples of the aforementioned basic acid acceptor include hydroxides, carboxylates, carbonates, borates, and phosphates of alkali metals, as well as trialkylamines.

As noted above, in addition to the aforementioned polyamine, the aqueous solution further comprises an amine salt, the amine salt preferably having three or four substituents on the nitrogen atom, examples of such substituents including alkyl, cycloaliphatic, benzyl, alkoxy and/or alkanol groups. Accordingly, the amine salt is preferably either a quaternary ammonium salt or a reaction product of a strong acid and a tertiary amine.

Examples of quaternary ammonium salts suitable for use in the present invention include tetraalkylammonium hydroxides, such as tetramethylammonium hydroxide, tetraethylammonium hydroxide and tetrapropylammonium hydroxide; benzyltrialkylammonium hydroxides, such as benzyltrimethylammonium hydroxide, benzyltriethylammonium hydroxide and benzyltripropylammonium hydroxide; and mixtures thereof.

Where the amine salt is the reaction product of a strong acid and a tertiary amine, the tertiary amine may be either a monofunctional tertiary amine or a polyfunctional tertiary amine. Examples of monofunctional tertiary amines suitable for use in the present invention include trialkylamines, such as trimethyl amine, triethyl amine, and tripropyl amine; N-alkylcycloaliphatic amines, such as 1-methylpiperidine, N,N-dimethylethylamine and N,N-diethylmethylamine; and N,N-dialkylethanolamines, such as N,N-dimethylethanolamine.

Examples of strong acids suitable for use in the present invention include methanesulfonic acid (MSA), toluenesulfonic acid (TSA), camphorsulfonic acid (CSA), ethanesulfonic acid (ESA), benzenesulfonic acid (BSA), and other aromatic, aliphatic, and cycloaliphatic sulfonic acids, trifluoroacetic acid, nitric acid, hydrochloric acid, sulfuric acid and mixtures thereof.

Where the amine salt is formed using a polyfunctional tertiary amine (said polyfunctional tertiary amine having n tertiary amine functional groups, n being greater than or equal to 2), said polyfunctional tertiary amine and said strong acid are preferably reacted together in a molar ratio that is greater than or equal to 1:1, respectively, and is less than 1:n, respectively (see U.S. Ser. No. 09/067,891, which is incorporated herein by reference). More preferably, said molar ratio of said polyfunctional tertiary amine to said strong acid is greater than or equal to 1:1 and less than or equal to 1:(0.95)n and even more preferably is greater than or equal to 1:1 and less than or equal to 1:(0.9)n.

Still even more preferably, said amine salt that is the reaction product of a polyfunctional tertiary amine and a strong acid comprises at least one tertiary amine salt functional group and at least one tertiary amine functional group. In this manner, although not wishing to be limited to any particular theory behind the invention, the present inventors believe that the tertiary amine salt functional group is free to act as a pore former in the polyamide membrane to thus enhance flux whereas the tertiary amine functional group is free to act as a proton acceptor for acid byproducts produced during the interfacial reaction between the polyfunctional amine (e.g., metaphenylenediamine) and the amine-reactive reactant (e.g., trimesoyl chloride). The bifunctional character of this type of amine salt appears to improve flux surprisingly more than do amine salts of the type having a single tertiary amine salt functional group and no tertiary amine functional groups or amine salts having two or more tertiary amine salt functional groups and no tertiary amine functional groups.

Examples of polyfunctional tertiary amines suitable for use in the present invention include 1,4-diazabicyclo[2,2,2]octane (DABCO), 1, 8-diazabicyclo[5,4,0]undec-7-ene, N,N,N',N'-tetramethyl-1,3-butanediamine (TMBD), N,N,N',N'-tetramethyl-1,6-hexanediamine, N,N',N',N',N"-pentamethyldiethylenetriamine, 1,1,3,3-tetramethylguanidine (TMGU), N,N,N',N'-tetramethylethylenediamine (TMED), substituted imidazoles, such as 1,2-dimethylimidazole (DMI), 1-alkyl-substituted imidazoles and other substituted imidizoles of the type described in U.S. Ser. No. 08/991,110 (which application is incorporated herein by reference), and mixtures thereof. Such polyfunctional tertiary amines are essentially non-monomeric, i.e., not polymerizable.

The amine salt of the present invention is preferably present in the aqueous solution in an amount constituting about 0.3 to 12%, by weight, of said aqueous solution, more preferably about 0.6 to 8%, by weight, of said aqueous solution.

As also noted above, in addition to the polyfunctional amine and the amine salt, the aqueous solution further comprises one or more polar solvents, said one or more polar solvents being selected from the group consisting of ethylene glycol derivatives, propylene glycol derivatives, 1,3-propanediol derivatives, selected alcohols, sulfoxide derivatives, sulfone derivatives, nitrile derivatives, urea derivatives, and mixtures thereof.

Examples of ethylene glycol derivatives suitable for use in the present invention include alkoxyethanols, such as 2-methoxyethanol, 2-ethoxyethanol, 2-propoxyethanol and 2-butoxyethanol, di(ethylene glycol) t-butylmethyl ether and di(ethylene glycol)hexyl ether.

Examples of propylene glycol derivatives suitable for use in the present invention include propylene glycol butyl ether and propylene glycol propyl ether. Examples of suitable alcohols for use in the present invention include 1-pentanol and 1-butanol. Examples of 1,3-propanediol derivatives suitable for use in the present invention include 1,3-heptanediol, 2-ethyl-1,3-hexanediol, 1,3-hexanediol and 1,3-pentanediol.

Examples of sulfoxide derivatives suitable for use in the present invention include dirnethyl sulfoxide, tetramethylene sulfoxide, butyl sulfoxide and methylphenyl sulfoxide. Examples of sulfone derivatives suitable for use in the present invention include tetramethylene sulfone and butyl sulfone.

Examples of nitrile derivatives suitable for use in the present invention include is selected from the group consisting of acetonitrile and propionitrile. An example of a urea derivative suitable for use in the present invention is 1,3-dimethyl-2-imidazolidinone.

Examples of preferred combinations of two or more polar solvents suitable for use in the present invention include 2-ethyl-1,3-hexanediol and dimethyl sulfoxide; di(ethylene glycol) hexyl ether and dimethyl sulfoxide; an alkoxyethanol (e.g., 2-butoxyethanol) and dimethyl sulfoxide; and 2-ethyl-1,3-hexanediol and acetonitrile.

Said one or more polar solvents of said aqueous solution preferably constitute a combined total of about 0.01%–8%, by weight, of said aqueous solution. This combined amount of polar solvents is smaller than that taught or suggested by U.S. Pat. Nos. 5,576,057 and 5,614,099, and yet yields equal or better results.

Where di(ethylene glycol) hexyl ether is used as a polar solvent, it preferably constitutes about 0.01% to about 0.3%, by weight, of said aqueous solution, more preferably about 0.1% to 0.3%, by weight, of said aqueous solution. Where 2-ethyl-1,3-hexanediol is used as a polar solvent, it preferably constitutes about 0.1% to 1.0%, by weight, of said aqueous solution. Where an alkoxyethanol is used as a polar solvent, it preferably constitutes about 0.05% to about 4%, by weight, of said aqueous solution. Where 1-pentanol is used as a polar solvent, it is preferably present in said aqueous solution in an amount constituting about 0.01% to about 2%, by weight, of said aqueous solution. Where 1-butanol is used as a polar solvent, it is preferably present in said aqueous solution in an amount constituting about 0.01% to about 3%, by weight, of said aqueous solution. Where the polar solvent is tetramethylene sulfone or methylphenyl sulfoxide, it is present in an amount constituting about 0.01% to about 4%, by weight, of said aqueous solution. Where butyl sulfone is used as a polar solvent, it is preferably present in an amount constituting about 0.01% to about 0.5%, by weight, of said aqueous solution. Where dimethyl sulfoxide is used as a polar solvent, it is preferably present in an amount constituting about 0.1% to about 7%, by weight, of said aqueous solution.

Without wishing to be limited to any particular theory behind the invention, the present inventors believe that the combination of the amine salts and the one or more polar solvents described above often has an unexpectedly advantageous effect on improving flux because the amine salts act as a pore former in the membrane while the polar solvents act as catalysts for the pore forming process upon heating of the membrane.

The amine-reactive reactant employed in the present invention is one or more compounds selected from the group consisting of a polyfunctional acyl halide, a polyfunctional sulfonyl halide and a polyfunctional isocyanate. Preferably, the amine-reactive reactant is an essentially monomeric, aromatic, polyfunctional acyl halide, examples of which include di- or tricarboxylic acid halides, such as trimesoyl chloride (TMC), isophthaloyl chloride (IPC), terephthaloyl chloride (TPC) and mixtures thereof. Examples of other amine-reactive reactants are disclosed in the patents incorporated herein by reference.

The amine-reactive reactant is present in an organic solvent solution, the solvent for said organic solvent solution comprising any organic liquid immiscible with water. The amine-reactive reactant is present in the organic liquid in an amount in the range of from about 0.005 to 5%, preferably 0.01 to 0.5%, by weight, of the solution. Examples of the aforementioned organic liquid include hexane, cyclohexane, heptane, alkanes having from 8 to 12 carbon atoms, and halogenated hydrocarbons, such as the FREON series. Other examples of the above-described organic liquid may be found in the patents incorporated herein by reference. Preferred organic solvents are alkanes having from 8 to 12 carbon atoms and mixtures thereof. ISOPAR® solvent (Exxon Corp.) is such a mixture of alkanes having from 8 to 12 carbon atoms.

In accordance with the method of the present invention, the above-described porous support is coated with the above-described aqueous solution utilizing either a hand coating or a continuous operation, and the excess solution is removed from the support by rolling, sponging, air knifing or other suitable techniques. Following this, the coated support material is then contacted, for example, by dipping or spraying, with the above-described organic solvent solution and allowed to remain in place for a period of time in the range of from about 5 seconds to about 10 minutes, preferably about 20 seconds to 4 minutes. The resulting product is then dried, preferably by heating at 50° C.–130° C., more preferably at about 70° C.–100° C. (e.g., at about 90° C.), for about 1 minute to about 10 minutes (preferably about 2–7 minutes), and then rinsed in a basic aqueous solution for about 1 to 30 minutes at a temperature between room temperature and about 95° C.

The following examples are provided for illustrative purposes only and are in no way intended to limit the scope of the present invention:

EXAMPLE 1

A 140 μm thick microporous polysulfone support including the backing non-woven fabric was soaked in an aqueous solution containing 2 wt % of meta-phenylenediamine (MPD), 2.3 wt % camphorsulfonic acid (CSA), 1.1 wt % triethylamine (TEA) and 2 wt % 2-butoxyethanol (BE) for 40 seconds. The support was drained and nip rolled to remove the excess aqueous solution. Then, the coated support was dipped in 0.1 wt % solution of trimesoyl chloride (TMC) in Isopar® solvent (Exxon Corp.) for 1 minute followed by draining the excess organic solution off the support. The resulting composite membrane was heated at 90° C. for about 3.5 minutes and then rinsed in 0.2% $Na_2CO_3$ aqueous solution for 30 minutes at room temperature before performance test. The performance of the reverse osmosis membrane was measured by passing an aqueous solution containing 2000 ppm of NaCl through the membrane at 225 psi. The salt rejection was 99% and the flux was 37 gfd.

EXAMPLES 2–36 and COMPARATIVE EXAMPLES A–W

The same procedure as set forth in Example 1 was carried out for each of Examples 2–36 and Comparative Examples A–W, except that the polar solvents listed in TABLE I were used instead of 2 wt % 2-butoxyethanol (BE).

TABLE I

| EXAMPLE | POLAR SOLVENT(S) | CONCENTRATION (wt %) | FLUX (GFD) | REJECTION (%) |
|---|---|---|---|---|
| 2 | dimethyl sulfoxide (DMSO) | 1 | 40 | 98.2 |
| 3 | 2-ethyl-1,3-hexanediol (EHD) | 0.1 | 35.2 | 94.5 |
| 4 | EHD | 0.2 | 42.6 | 96.0 |
| 5 | EHD | 0.3 | 47.9 | 97.6 |
| 6 | EHD | 0.4 | 47.5 | 97.1 |
| 7 | DMSO and EHD | 2 and 0.3, respectiveiy | 75.6 | 93.5 |
| 8 | DMSO and EHD | 2 and 0.2, respectively | 76.8 | 92.8 |
| 9 | DMSO and EHD | 0.5 and 0.3, respectively | 58.4 | 96.6 |
| 10 | DMSO and EHD | 5 and 0.3 | 72.4 | 90.7 |
| 11 | DMSO and EHD | 7 and 0.3 | 69.5 | 86.6 |
| 12 | EHD and acetonitrile | 0.2 and 4, respectively | 50.7 | 83.5 |
| 13 | DMSO and BE | 2 and 2 | 65.3 | 93.2 |
| 14 | DMSO and BE | 0.5 and 2, respectively | 46.0 | 98.0 |
| 15 | DMSO and BE | 0.1 and 0.1 | 44.8 | 97.9 |
| 16 | BE | 0.1 | 34.5 | 98.4 |
| 17 | BE | 4 | 36.4 | 96.7 |
| COMP. A | BE | 6 | 28.7 | 94.0 |
| COMP. B | BE | 8 | 26.0 | 91.4 |
| 18 | 2-propoxyethanol (PE) | 0.1 | 22.1 | 95.1 |
| 19 | PE | 2 | 43.5 | 97.0 |
| 20 | PE | 4 | 40.6 | 95.4 |
| 21 | 2-ethoxyethanol | 2 | 39.2 | 96.6 |
| 22 | 2-ethoxyethanol | 4 | 45.7 | 94.3 |
| 23 | 2-methoxyethanol | 2 | 38.2 | 96.6 |
| 24 | 2-methoxyethanol | 4 | 36.7 | 88.6 |
| COMP. C | propylene glycol | 2 | 23.1 | 96.9 |
| COMP. D | ethylene glycol dimethyl ether | 2 | 36.3 | 92.9 |

TABLE I-continued

| EXAMPLE | POLAR SOLVENT(S) | CONCENTRATION (wt %) | FLUX (GFD) | REJECTION (%) |
|---|---|---|---|---|
| COMP. E | ethylene glycol diethyl ether | 2 | 31.4 | 95.6 |
| 25 | di(ethylene glycol) hexyl ether (DEGHE) | 0.2 | 36.6 | 97.7 |
| COMP. F | di(ethylene glycol) butyl ether | 2 | 31.2 | 95.9 |
| COMP. G | di(ethylene glycol) butyl ether | 0.1 | 32.7 | 93.1 |
| COMP. H | di(ethylene glycol) ethyl ether | 2 | 34.7 | 96.1 |
| COMP. I | di(ethylene glycol) methyl ether | 2 | 32.5 | 96.4 |
| COMP. J | di(ethylene glycol) diethyl ether | 2 | 31.0 | 95.9 |
| 26 | di(ethylene glycol) t-butylmethyl ether | 2 | 38.2 | 95.6 |
| 27 | propylene glycol butyl ether | 2 | 39.7 | 96.9 |
| 28 | propylene glycol propyl ether | 2 | 37.3 | 94.5 |
| 29 | 1-pentanol | 1 | 33.2 | 97.3 |
| 30 | 1-butanol | 2 | 38.3 | 97.1 |
| COMP. K | 1-propanol | 2 | 32.4 | 91.2 |
| COMP. L | isopropanol | 3 | 30.8 | 90.7 |
| COMP. M | isopropanol | 10 | 34.7 | 89.4 |
| 31 | 1,3-dimethyl-2-imidazolidinone | 1 | 54.2 | 92.1 |
| 32 | tetramethylene sulfoxide | 1 | 46.6 | 94.8 |
| 33 | butylsulfoxide | 1 | 42.2 | 95.6 |
| 34 | methylphenyl sulfoxide | 1 | 38.0 | 97.5 |
| COMP. O | ethyl sulfone | 1 | 29.9 | 93.6 |
| 35 | tetramethylene sulfone (TMSO) | 1 | 44.6 | 91.8 |
| 36 | butyl sulfone | 0.5 | 40.2 | 98.0 |
| COMP. P | N,N-dimethylformamide | 1 | 35.9 | 94.4 |
| COMP. Q | N-methylpyrrolidinone | 2 | 26.9 | 94.5 |
| COMP. R | acetone | 2 | 30.8 | 96.3 |
| COMP. S | none | 0 | 26.0 | 98.0 |
| COMP. T | 1,6-hexanediol | 1 | 37.8 | 95.6 |
| COMP. U | 1,6-hexanediol | 0.5 | 34.4 | 97.6 |
| COMP. V | 1,6-hexanediol | 0.25 | 31.4 | 97.7 |
| COMP. W | 1,2-hexandiol | 1 | 29.3 | 98.0 |

EXAMPLE 37

The same procedure as set forth in Example 1 was repeated, except that 0.3 wt % EHD was used instead of 2 wt % BE and that 1 wt % 1,1,3,3-tetramethyl guanidine (TMGU) and 1.6 wt % toluenesulfonic acid (TSA) were used instead of TEA and CSA, respectively. The flux and the salt rejection of the resultant membrane were 43.4 gfd and 96.3%, respectively.

EXAMPLES 38–78 and COMPARATIVE EXAMPLES X–AI

The same procedure as set forth in Example 37 was carried out for each of Examples 38–78 and Comparative Examples X–AI, except that the polar solvents listed in TABLE II were used 0.3 wt % EHD and except that the amine and acid listed in TABLE II were used TMGU and TSA, respectively.

TABLE II

| EXAMPLE | AMINE (wt %)/ACID (wt %) or QUATERNARY AMMONIUM SALT | POLAR SOLVENT (wt %) | FLUX (GFD) | REJECTION (%) |
|---|---|---|---|---|
| 38 | 2-dimethylimidazole (DMI)(1)/TSA(1.9) | EHD(0.3) | 46.1 | 95.2 |
| COMP. X | TMGU(1)/TSA(1.6) | none | 25.4 | 93.3 |
| 39 | TMGU(1)/TSA(1.6) | EHD(0.3)/DMSO(2) | 63.7 | 90.8 |
| 40 | TMGU(1)/TSA(1.6) | DEGHE(0.2)/DMSO(2) | 59.5 | 86.9 |
| COMP. Y | TMGU(1)/CSA(2.0) | none | 26.7 | 97.6 |
| 41 | TMGU(1)/CSA(2.0) | EHD(0.3) | 42.0 | 97.4 |
| COMP. Z | DMI(1)/TSA(1.9) | none | 42.8 | 91.5 |

TABLE II-continued

| EXAMPLE | AMINE (wt %)/ACID (wt %) or QUATERNARY AMMONIUM SALT | POLAR SOLVENT (wt %) | FLUX (GFD) | REJECTION (%) |
|---|---|---|---|---|
| 42 | DMI(1)/TSA(1.9) | EHD(0.3) | 46.1 | 95.2 |
| 43 | DMI(1)/TSA(1.9) | EHD(0.3)/DMSO(4) | 56.6 | 86.9 |
| 44 | DMI(1)/TSA(1.9) | BE(1) | 41.7 | 97.5 |
| 45 | DMI(1)/TSA(1.9) | BE(1)/DMSO(4) | 49.7 | 90.1 |
| 46 | DMI(1)/CSA(2) | BE(1)/DMSO(3) | 56.9 | 87.2 |
| 47 | DMI(1)/CSA(2) | EHD(0.3)/DMSO(4) | 46.1 | 95.2 |
| COMP. AA | DMI(1)/CSA(2) | none | 38.7 | 89.1 |
| 48 | DMI(1)/CSA(2) | BE(1) | 47.4 | 95.5 |
| 49 | DMI(1)/CSA(2) | EHD(0.3) | 52.9 | 95.5 |
| 50 | DMI(1)/CSA(2) | triethylene glycol dimethyl ether TEGD(1) | 42.5 | 92.6 |
| COMP. AB | TMBD(1)/TSA(1.3) | none | 29.1 | 97.1 |
| 51 | TMBD(1)/TSA(1.3) | EHD(0.3) | 36.7 | 97.8 |
| 52 | TMBD(1)/TSA(1.3) | EHD(0.3)/DMSO(4) | 56.5 | 86.7 |
| 53 | TMBD(1)/TSA(1.3) | BE(1) | 35.5 | 97.8 |
| 54 | TMBD(1)/TSA(1.3) | BE(1)/DMSO(3) | 55.7 | 90.2 |
| COMP. AC | TMBD(1)/CSA(1.6) | none | 24.5 | 97.5 |
| 55 | TMBD(1)/CSA(1.6) | EHD(0.3) | 40.0 | 97.4 |
| 56 | TMBD(1)/CSA(1.6) | EHD(0.3)/DMSO(4) | 52 | 93.4 |
| COMP. AD | TMED(1)/MSA(0.83) | none | 32.5 | 72.9 |
| 57 | TMED(1)/MSA(0.83) | BE(1) | 35.6 | 89.1 |
| 58 | TMED(1)/MSA(0.83) | EHD(0.3) | 38.7 | 94.6 |
| 59 | TMED(1)/MSA(0.83) | DMSO(1) | 41.1 | 90.0 |
| 60 | TMED(1)/TSA(1.32) | EHD(0.3) | 25.7 | 95.1 |
| 61 | TMED(1)/TSA(1.32) | EHD(0.3)/DMSO(2) | 39.2 | 92.4 |
| COMP. AE | DABCO(1)/MSA(0.85) | none | 32.3 | 97.0 |
| 62 | DABCO(1)/MSA(0.85) | BE(1)/DMSO(4) | 48.6 | 88.3 |
| 63 | DABCO(1)/MSA(0.85) | BE(1)/TMSO(4) | 24.4 | 88.5 |
| 64 | DABCO(2)/MSA(1.7) | BE(2) | 36.9 | 96.2 |
| COMP. AF | DABCO(1)/TSA(1.7) | none | 31.3 | 95.7 |
| 65 | DABCO(1)/TSA(1.7) | BE(1) | 33.2 | 96.9 |
| 66 | DABCO(1)/TSA(1.7) | BE(1)/DMSO(4) | 48.8 | 88.8 |
| 67 | DABCO(1)/TSA(1.7) | EHD(0.3) | 30.2 | 95.3 |
| 68 | DABCO(1)/TSA(1.7) | EHD(0.3)/DMSO(4) | 48.0 | 88.9 |
| COMP. AG | benzyltrimethyl-ammonium chloride (BTAC)(1.5) | none | 30.2 | 90.7 |
| 69 | BTAC(1.5) | BE(1)/DMSO(3) | 46.5 | 91.6 |
| 70 | BTAC(1.5) | EHD(0.3)/DMSO(3) | 48.0 | 92.3 |
| COMP. AH | triethylamine(TEA)(2)/TSA(3.4) | none | 34.1 | 98.1 |
| 71 | TEA(2)/TSA(3.4) | EHD(0.3) | 38.0 | 97.3 |
| 72 | TEA(2)/TSA(3.4) | EHD(0.3)/DMSO(3) | 57.1 | 87.5 |
| 73 | TEA(2)/TSA(3.4) | BE(1) | 45.2 | 97.3 |
| 74 | TEA(2)/TSA(3.4) | BE(1)/DMSO(3) | 52.4 | 83.3 |
| COMP. AI | N,N-dimethylbenzylamine (DMBA)(1)/TSA(1.4) | none | 34.5 | 97.9 |
| 75 | DMBA(1)/TSA(1.4) | EHD(0.3) | 32.2 | 96.0 |
| 76 | DMBA(1)/TSA(1.4) | EHD(0.3)/DMSO(3) | 47.1 | 87.2 |
| 77 | DMBA(1)/TSA(1.4) | BE(1) | 34.0 | 97.9 |
| 78 | DMBA(1)/TSA(1.4) | BE(1)/DMSO(3) | 56.9 | 82.8 |

As can be seen from the above data, the selection of specific polar solvents can have an appreciable effect on the flux and rejection rate of the composite polyamide membrane made in the presence thereof. For example, compare the flux and rejection rates of Examples 1, 16 and 17 for 2%, 0.1% and 4% 2-butoxyethanol (a.k.a. ethylene glycol monobutyl ether) with that for Comparative Examples D and E for 2% ethylene glycol dimethyl ether and 2% ethylene glycol diethyl ether. In addition, compare the flux and rejection rate of Example 25 for 0.2% di(ethylene glycol) hexyl ether with that of Comparative Examples F through I for solvents of similar structure. Other comparisons which exhibit appreciable differences in flux or flux and rejection rate include Example 26 for 2% di(ethylene glycol) t-butylmethyl ether with Comparative Example J for 2% di(ethylene glycol) diethyl ether; Example 35 for tetramethylene sulfone with Comparative Example O for ethyl sulfone; and Examples 3 through 6 for 0.1%, 0.2%, 0.3% and 0.4% EHD with Comparative Examples D through J and T through W for ethylene glycol dimethyl ether, ethylene glycol diethyl ether, di(ethylene glycol) butyl ether, di(ethylene glycol) ethyl ether, di(ethylene glycol) methyl ether, di(ethylene glycol) diethyl ether, 1,6-hexanediol and 1,2-hexanediol.

Moreover, an unexpected effect appears to exist when certain combinations of polar solvents are used with an amine salt. For instance, the combination of BE and DMSO or the combination of EHD and DMSO appears to result in a significantly higher flux than would be obtained in the presence of the constituent solvents used alone. (Compare Examples 13 (2% DMSO and 2% BE), 14 (0.5% DMSO and 2% BE) and 15 (0.1% DMSO and 0.1% BE) with Example 2 (1% DMSO) and Example 1 (2% BE).) This increase in flux is not apparently the case for all combinations of polar solvents, as indicated by Example 63.

The embodiments of the present invention recited herein are intended to be merely exemplary and those skilled in the art will be able to make numerous variations and modifications to it without departing from the spirit of the present invention. All such variations and modifications are intended to be within the scope of the present invention as defined by the claims appended hereto.

What is claimed is:

1. A polyamide membrane comprising a reaction product of (i) an aqueous solution comprising water, a polyfunctional amine, a salt-containing compound and one or more polar solvents, said salt-containing compound comprising at least one tertiary amine salt functional group and at least one tertiary amine functional group, and (ii) an organic solvent solution comprising an amine-reactive reactant selected from the group consisting of a polyfunctional acyl halide, a polyfunctional sulfonyl halide and a polyfunctional isocyanate.

2. The polyamide membrane as claimed in claim 1 wherein said compound has no more than one tertiary amine salt function group and no more than one tertiary amine functional group.

3. The polyamide membrane as claimed in claim 1 wherein said compound is a reaction product of a strong acid and a polyfunctional tertiary amine.

4. The polyamide membrane as claimed in claim 3 wherein said strong acid is selected from the group consisting of an aromatic sulfonic acid, an aliphatic sulfonic acid, a cycloaliphatic sulfonic acid, trifluoroacetic acid, nitric acid, hydrochloric acid, sulfuric acid and mixtures thereof.

5. The polyamide membrane as claimed in claim 4 wherein said strong acid is selected from the group consisting of methanesulfonic acid, toluenesulfonic acid, camphorsulfonic acid, ethanesulfonic acid and benzenesulfonic acid.

6. The polyamide membrane as claimed in claim 3 wherein said salt-containing compound is present in said aqueous solution in an amount constituting about 0.3 to 12%, by weight, of said aqueous solution.

7. The polyamide membrane as claimed in claim 1 wherein said polyfunctional amine is at least one member selected from the group consisting of an aromatic primary diamine and substituted derivatives thereof, an alkane primary diamine, a cycloaliphatic primary diamine, a cycloaliphatic secondary diamine, an aromatic secondary diamine and a xylylene diamine.

8. The polyamide membrane as claimed in claim 7 wherein said polyfunctional amine is meta-phenylenediamine.

9. The polyamide membrane as claimed in claim 1 wherein said polyfunctional amine is present in said aqueous solution in an amount constituting about 0.1 to 20%, by weight, of said aqueous solution.

10. The polyamide membrane as claimed in claim 1 wherein said amine-reactive reactant is at least one member selected from the group consisting of an isophthaloyl halide, a terephthaloyl halide and a trimesoyl halide.

11. The polyamide membrane as claimed in claim 10 wherein said amine-reactive reactant is trimesoyl chloride.

12. The polyamide membrane as claimed in claim 1 wherein said amine-reactive reactant is present in said organic solution in an amount constituting about 0.01 to 10%, by weight, of said organic solvent solution.

13. The polyamide membrane as claimed in claim 1 wherein said one or more polar solvents are selected from the group consisting of ethylene glycol derivatives, propylene glycol derivatives, 1,3-propanediol derivatives, sulfoxide derivatives, sulfone derivatives, nitrile derivatives and urea derivatives.

14. The polyamide membrane as claimed in claim 13 wherein said ethylene glycol derivative is selected from the group consisting of 2-methoxyethanol, 2-ethoxyethanol, 2-propoxyethanol, 2-butoxyethanol, di(ethylene glycol) t-butylmethyl ether and di(ethylene glycol)hexyl ether, wherein said propylene glycol derivative is selected from the group consisting of propylene glycol butyl ether and propylene glycol propyl ether, wherein said 1,3-propanediol derivative is selected from the group consisting of 1,3-heptanediol, 2-ethyl-1,3-hexanediol, 1,3-hexanediol and 1,3-pentanediol, wherein said sulfoxide derivative is selected from the group consisting of dimethyl sulfoxide, tetramethylene sulfoxide, butyl sulfoxide and methylphenyl sulfoxide, wherein said sulfone derivative is selected from the group consisting of tetramethylene sulfone and butyl sulfone, wherein said nitrile derivative is selected from the group consisting of acetonitrile and propionitrile and wherein said urea derivative is 1,3-dimethyl-2-imidazolidinone.

15. The polyamide membrane as claimed in claim 1 wherein said one or more polar solvents are present in said aqueous solution in a total amount constituting about 0.01 to 8%, by weight, of said aqueous solution.

16. A composite reverse osmosis membrane comprising:
(a) a porous support; and
(b) a polyamide membrane as claimed in claim 1 on said porous support.

17. The composite reverse osmosis membrane as claimed in claim 16 wherein said porous support is made of a material selected from the group consisting of polysulfone, a polyether sulfone, a polyimide, a polyamide, polypropylene and polyvinylidene fluoride.

18. A polyamide membrane comprising a reaction product of (i) an aqueous solution comprising water, a polyfunctional amine, a salt-containing compound and one or more polar solvents, said salt-containing compound comprising at least one tertiary amine salt functional group and at least one tertiary amine functional group, said salt-containing compound being a reaction product of a strong acid and a polyfunctional tertiary amine, said polyfunctional tertiary amine being selected from the group consisting of 1,4-diazabicyclo[2,2,2]octane, 1,8-diazabicyclo[5,4,0]undec-7-ene, N,N,N',N'-tetramethyl-1,3-butanediamine, N,N,N',N'-tetramethyl-1,6-hexanediamine, N,N,N',N', N"-pentamethyldiethylenetriamine, 1,1,3,3,-tetramethylguanidine, N,N,N',N'-tetramethylethylenediamine, substituted imidizoles, and mixtures thereof, and (ii) an organic solvent solution comprising an amine-reactive reactant selected from the group consisting of a polyfunctional acyl halide, a polyfunctional sulfonyl halide and a polyfunctional isocyanate.

19. A polyamide membrane comprising a reaction product of (i) an aqueous solution comprising water, a polyfunctional amine, a salt-containing compound and one or more polar solvents, said salt-containing compound comprising at least one tertiary amine salt functional group and at least one tertiary amine functional group, said salt-containing compound being a reaction product of a strong acid and a polyfunctional tertiary amine, said strong acid being selected from the group consisting of camphorsulfonic acid and toluene sulfonic acid, said polyfunctional tertiary amine being selected from the group consisting of 1,4-diazabicyclo[2,2,2]octane, N,N,N',N'-tetramethyl-1,3-butanediamine and 1,2-dimethylimidazole, and (ii) an organic solvent solution comprising an amine-reactive reactant selected from the group consisting of a polyfunctional acyl halide, a polyfunctional sulfonyl halide and a polyfunctional isocyanate.

20. A polyamide membrane comprising a reaction product of (i) an aqueous solution comprising water, a polyfunctional amine, a salt-containing compound and one or more polar solvents, said salt-containing compound being a reaction product of a strong acid and a polyfunctional tertiary amine and (ii) an organic solvent solution comprising an amine-reactive reactant selected from the group consisting of a polyfunctional acyl halide, a polyfunctional sulfonyl halide and a polyfunctional isocyanate.

21. The polyamide membrane as claimed in claim 20 wherein said polyfunctional tertiary amine has n tertiary amine functional groups, n being greater than or equal to 2, and wherein said polyfunctional tertiary amine and said strong acid are reacted together in a molar ratio that is greater than or equal to 1:1, respectively, and is less than 1:n, respectively.

22. The polyamide membrane as claimed in claim 21 wherein said polyfunctional tertiary amine and said strong acid are reacted together in a molar ratio that is less than 1:(0.95)n, respectively.

23. The polyamide membrane as claimed in claim 21 wherein said polyfunctional tertiary amine and said strong acid are reacted together in a molar ratio that is less than 1:(0.9)n, respectively.

24. The polyamide membrane as claimed in claim 21 wherein said polyfunctional tertiary amine has exactly 2 tertiary amine functional groups.

25. The polyamide membrane as claimed in claim 24 wherein said polyfunctional tertiary amine and said strong acid are reacted together in a 1:1 molar ratio.

26. The polyamide membrane as claimed in claim 20 wherein said strong acid is selected from the group consisting of an aromatic sulfonic acid, an aliphatic sulfonic acid, a cycloaliphatic sulfonic acid, trifluoroacetic acid, nitric acid, hydrochloric acid, sulfuric acid and mixtures thereof.

27. The polyamide membrane as claimed in claim 26 wherein said strong acid is selected from the group consisting of methanesulfonic acid, toluenesulfonic acid, camphorsulfonic acid, ethanesulfonic acid and benzenesulfonic acid.

28. A composite reverse osmosis membrane comprising:
(a) a porous support; and
(b) a polyamide membrane as claimed in claim 20 on said porous support.

29. A polyamide membrane comprising a reaction product of (i) an aqueous solution comprising water, a polyfunctional amine, a salt-containing compound and one or more polar solvents, said salt-containing compound being a reaction product of a strong acid and a polyfunctional tertiary amine, said polyfunctional tertiary amine being selected from the group consisting of 1,4-diazabicyclo[2,2,2]octane, 1,8-diazabicyclo[5,4,0]undec-7-ene, N,N,N',N'-tetramethyl-1,3-butanediamine, N,N,N',N'-tetramethyl-1,6-hexanediamine, N,N,N',N',N"-pentamethyldiethylenetriamine, 1,1,3,3-tetramethylguanidine, N,N,N',N'-tetramethylethylenediamine, substituted imidizoles, and mixtures thereof, and (ii) an organic solvent solution comprising an amine-reactive reactant selected from the group consisting of a polyfunctional acyl halide, a polyfunctional sulfonyl halide and a polyfunctional isocyanate.

30. A polyamide membrane comprising a reaction product of (i) an aqueous solution comprising a polyfunctional amine, an amine salt and one or more polar solvents, wherein said one or more polar solvents are selected from the group consisting of 2-ethyl-1,3-hexanediol; a combination of 2-ethyl-1,3-hexanediol and dimethyl sulfoxide; di(ethylene glycol) hexyl ether; a combination of di(ethylene glycol) hexyl ether and dimethyl sulfoxide; di(ethylene glycol) t-butylmethyl ether; triethylene glycol dimethyl ether; a combination of 2-ethyl-1,3-hexanediol and acetonitrile; and mixtures thereof, and (ii) an organic solvent solution comprising an amine-reactive reactant selected from the group consisting of a polyfunctional acyl halide, a polyfunctional sulfonyl halide and a polyfunctional isocyanate.

31. The polyamide membrane as claimed in claim 30 wherein said amine salt is selected from the group consisting of a quaternary ammonium salt and a reaction product of a strong acid and a tertiary amine.

32. The polyamide membrane as claimed in claim 31 wherein said amine salt is a reaction product selected from the group consisting of a reaction product of camphorsulfonic acid and triethylamine, a reaction product of toluenesulfonic acid and triethylamine, a reaction product of toluenesulfonic acid and dimethylbenzylamine, and a reaction product of camphorsulfonic acid and dimethylbenzylamine.

33. The polyamide membrane as claimed in claim 32 wherein said one or more polar solvents are a mixture of 2-ethyl-1,3-hexanediol and dimethyl sulfoxide.

34. The polyamide membrane as claimed in claim 32 wherein said one or more polar solvents is 1,3-dimethyl-2-imidazolidinone.

35. The polyamide membrane as claimed in claim 31 wherein said amine salt is a reaction product of a strong acid and a polyfunctional tertiary amine.

36. The polyamide membrane as claimed in claim 31 wherein said amine salt is a quaternary ammonium salt.

37. The polyamide membrane as claimed in claim 36 wherein said one or more polar solvents are a mixture of 2-ethyl-1,3-hexanediol and dimethyl sulfoxide and wherein said quaternary ammonium salt is benzyltrimethyl ammonium chloride.

38. A composite reverse osmosis membrane comprising:
(a) a porous support; and
(b) a polyamide membrane as claimed in claim 30 on said porous support.

39. A polyamide membrane comprising a reaction product of (i) an aqueous solution comprising a polyfunctional amine, an amine salt and 2-ethyl-1,3-hexanediol, wherein said amine salt is a reaction product selected from the group consisting of a reaction product of 1,1,3,3-tetramethylguanidine and toluenesulfonic acid; a reaction product of 1,1,3,3-tetramethylguanidine and camphorsulfonic acid; a reaction product of 1,2-dimethylimidazole and toluenesulfonic acid; a reaction product of 1,2-methylimidazole and camphorsulfonic acid; a reaction product of N,N,N',N'-tetramethyl-1,3-butanediamine and toluenesulfonic acid; a reaction product of N,N,N',N'-tetramethyl-1,3-butanediamine and camphorsulfonic acid; a reaction product of N,N,N',N'-tetramethylethylenediamine and methanesulfonic acid; a reaction product of N,N,N',N'-tetramethylethylenediamine and toluene sulfonic acid; and a reaction product of 1,4-diazabicyclo[2,2,2]octane and toluene sulfonic acid, and (ii) an organic solvent solution comprising an amine-reactive reactant selected from the group consisting of a polyfunctional acyl halide, a polyfunctional sulfonyl halide and a polyfunctional isocyanate.

40. The polyamide membrane as claimed in claim 39 wherein said amine salt is a reaction product of a 1:1 molar mixture of said strong acid and said polyfunctional tertiary amine.

41. A polyamide membrane comprising a reaction product of (i) an aqueous solution comprising a polyfunctional amine, an amine salt and a mixture of 2-ethyl-1,3-hexanediol and dimethyl sulfoxide wherein said amine salt is a reaction product of a strong acid and a polyfunctional tertiary amine, said reaction product being selected from the group consisting of a reaction product of 1,1,3,3-tetramethylguanidine and toluenesulfonic acid; a reaction product of 1,2-dimethylimidazole and toluenesulfonic acid; a reaction product of 1,2-dimethylimidazole and camphorsulfonic acid; a reaction product of N,N,N',N'-tetramethyl-1,3-butanediamine and toluenesulfonic acid; a reaction product of N,N,N',N'-tetramethyl-1,3-butanediamine and camphorsulfonic acid; a reaction product of N,N,N',N'-tetramethylethylenediamine and toluenesulfonic acid; and a reaction product of 1,4-diazabicyclo[2,2,2]octane and toluenesulfonic acid, and (ii) an organic solvent solution comprising an amine-reactive reactant selected from the group consisting of a polyfunctional acyl halide, a polyfunctional sulfonyl halide and a polyfunctional isocyanate.

42. A polyamide membrane comprising a reaction product of (i) an aqueous solution comprising a polyfunctional amine, an amine salt and triethylene glycol dimethyl ether wherein said amine salt is a reaction product of a strong acid and a polyfunctional tertiary amine, said polyfunctional tertiary amine being 1,2-dimethylimidazole and said strong acid being camphorsulfonic acid, and (ii) an organic solvent solution comprising an amine-reactive reactant selected from the group consisting of a polyfunctional acyl halide, a polyfunctional sulfonyl halide and a polyfunctional isocyanate.

43. A polyamide membrane comprising a reaction product of (i) an aqueous solution comprising a polyfunctional amine, an amine salt and a combination of di(ethylene glycol) hexyl ether and dimethyl sulfoxide wherein said amine salt is a reaction product of a strong acid and a polyfunctional tertiary amine, said polyfunctional tertiary amine being 1,1,3,3-tetramethylguanidine and said strong acid being toluenesulfonic acid, and (ii) an organic solvent solution comprising an amine-reactive reactant selected from the group consisting of a polyfunctional acyl halide, a polyfunctional sulfonyl halide and a polyfunctional isocyanate.

44. A polyamide membrane comprising a reaction product of (i) an aqueous solution comprising a polyfunctional amine, an amine salt and one or more polar solvents, wherein said one or more polar solvents are selected from the group consisting of an alkoxyethanol in an amount constituting about 0.05% to about 4%, by weight, of said aqueous solution; a combination of an alkoxyethanol in an amount constituting about 0.05% to about 4%, by weight, of said aqueous solution and dimethyl sulfoxide in an amount constituting about 0.01% to about 5%, by weight, of said aqueous solution; and (ii) an organic solvent solution comprising an amine-reactive reactant selected from the group consisting of a polyfunctional acyl halide, a polyfunctional sulfonyl halide and a polyfunctional isocyanate.

45. The polyamide membrane as claimed in claim 44 wherein said amine salt is selected from the group consisting of a quaternary ammonium salt and a reaction product of a strong acid and a tertiary amine.

46. The polyamide membrane as claimed in claim 45 wherein said amine salt is a reaction product selected from the group consisting of a reaction product of camphorsulfonic acid and triethylamine and a reaction product of toluenesulfonic acid and triethylamine.

47. The polyamide membrane as claimed in claim 45 wherein said amine salt is a reaction product of a strong acid and a polyfunctional tertiary amine.

48. The polyamide membrane as claimed in claim 44 wherein said alkoxyethanol is 2-butoxyethanol.

49. The polyamide membrane as claimed in claim 48 wherein said amine salt is a reaction product selected from the group consisting of a reaction product of 1,2-dimethylimidazole and toluene sulfonic acid; a reaction product of 1,2-dimethylimidazole and camphorsulfonic acid; a reaction product of N,N,N',N'-tetramethylethylenediamine and methanesulfonic acid; a reaction product of N,N,N',N'-tetramethyl-1,3-butanediamine and toluene sulfonic acid; a reaction product of 1,4-diazabicyclo[2,2,2]octane and methanesulfonic acid; a reaction product of toluenesulfonic acid and triethylamine; and a reaction product of 1,4-diazabicyclo[2,2,2]octane and toluene sulfonic acid.

50. The polyamide membrane as claimed in claim 44 wherein said one or more polar solvents are a combination of 2-butoxyethanol in an amount constituting about 0.05% to about 4%, by weight, of said aqueous solution and dimethyl sulfoxide in an amount constituting about 0.01% to about 5%, by weight, of said aqueous solution.

51. A polyamide membrane comprising a reaction product of (i) an aqueous solution comprising a polyfunctional amine, an amine salt and a combination of 2-butoxyethanol in an amount constituting about 0.05% to about 4%, by weight, of said aqueous solution and dimethyl sulfoxide in an amount constituting about 0.01% to about 8%, by weight, of said aqueous solution wherein said amine salt is a reaction product selected from the group consisting of a reaction product of 1,2-dimethylimidazole and toluene sulfonic acid; a reaction product of 1,2-dimethylimidazole and camphorsulfonic acid; a reaction product of N,N,N',N'-tetramethyl-1,3-butanediamine and toluene sulfonic acid; a reaction product of 1,4-diazabicyclo[2,2,2]octane and methanesulfonic acid; and a reaction product of 1,4-diazabicyclo[2,2,2]octane and toluene sulfonic acid, and (ii) an organic solvent solution comprising an amine-reactive reactant selected from the group consisting of a polyfunctional acyl halide, a polyfunctional sulfonyl halide and a polyfunctional isocyanate.

52. The polyamide membrane as claimed in claim 44 wherein said one or more polar solvents is dimethyl sulfoxide in an amount constituting about 0.01% to about 5%, by weight, of said aqueous solution.

* * * * *